United States Patent
Maeda

[15] 3,665,830
[45] May 30, 1972

[54] FILM TRANSPORT MECHANISM

[72] Inventor: Keisuke Maeda, Sumie-Higashi, Japan

[73] Assignee: Minolta Camera Kabushiki Kaisha, Osaka, Japan

[22] Filed: Aug. 17, 1970

[21] Appl. No.: 64,429

[30] Foreign Application Priority Data

Aug. 10, 1970 Japan..................................45/60892

[52] U.S. Cl. ............................................95/31 FL, 95/31 R
[51] Int. Cl. ........................................G03b 1/06, G03b 1/62
[58] Field of Search ..........................95/31 R, 31 AC, 31 FL; 242/71.4, 71.5

[56] References Cited

UNITED STATES PATENTS

| 3,335,695 | 8/1967 | Hayashi | 352/172 X |
| 2,853,929 | 9/1958 | Hovarik | 95/31 AC |

FOREIGN PATENTS OR APPLICATIONS

| 37/2227 | 1962 | Japan | 95/31 R |
| 718,611 | 11/1954 | Great Britain | 95/31 FL |
| 213,437 | 2/1941 | Switzerland | 95/31 FL |

*Primary Examiner*—Samuel S. Matthews
*Assistant Examiner*—Russell E. Adams, Jr.
*Attorney*—Stanley Wolder

[57] ABSTRACT

In operative relation with a film counter, a detection mechanism detects film transport from the starting position to the first photographic position, the mechanism further being adapted to detect whether or not the film is being wound up on a take-up spool. The detection mechanism is associated with a release button locking mechanism and a film transport blocking mechanism so that until a predetermined amount of film has been wound up on the take-up spool, the film can be advanced without releasing the shutter. Upon detecting the winding of a predetermined amount of the film, the film transport blocking mechanism blocks the film winding operation and the release button is freed from locking. In operative relationship with subsequent shutter release and film winding operation, normal release button locking and film transport blocking operations are effected. Also mounted in the camera in operative relationship with the above mechanisms in another detection mechanism to be actuated upon detecting the loading of a film magazine, the magazine detection mechanism being so adapted that when a film magazine is not loaded the film transport blocking mechanism and the release button locking mechanism are allowed to function in operative relationship with film winding and shutter release operations and that upon detecting loading of the magazine, the magazine detection mechanism frees the film winding mechanism, permitting the foregoing mechanisms to operate accurately.

6 Claims, 6 Drawing Figures 3,665,830

FILM TRANSPORT MECHANISM

BACKGROUND OF THE INVENTION

The present invention relates to a film transport mechanism for cameras and more particularly to a mechanism for advancing a film with ease and reliability when the film has to be wound up two or three frames after it is loaded into the camera.

Generally, a roll film housed in a magazine has a leader extending outward from the magazine so that the film can be wound up on the take-up spool when loaded in the camera. For taking photographs, the leader is first wound on the spool, the camera back is closed, and then the film has to be advanced the distance of a few frames in order to bring the unexposed portion to the normal photographing position. In the case where the camera is provided with a double exposure prevention mechanism and an automatic film transport blocking mechanism, the film can not be advanced without effecting shutter release every time the film has been advanced a frame, hence there is a need to repeat such procedure several times. On the other hand, the number of frames to be wasted differs from person to person and there arises an instance where excess number of exposures are made only to waste the film and reduce the number of the frames effective for taking photographs. With so-called "electric eye cameras" another trouble is encountered, since such cameras are provided with a safety device for locking a release button which retains the release button in locked position while the camera is not operated on the photoelectric system. Accordingly, for making idle exposures, there is a need to switch the camera from automatic operation to manual operation. In addition, if the user should forget to switch the camera from manual operation to automatic operation after making several exposures to bring the unexposed portion of the film to the photographing position, the photoelectric system will not operate and the film will be wasted.

Furthermore with cameras which are presently in use, it is difficult to load the film properly and even when the film leader is wound on the spool, the film leader may get released from the spool when the camera back is closed, with the result that not infrequently film winding can not be effected or the same frame will be subjected to a number of exposures since the film is not advanced. Moreover, such accident which can not be detected from the outside of the camera is found out for the first time when the film is developed because, in spite of the trouble, shutter release and film locking operations are conducted normally. Due to the fact that conventional cameras are not provided with means for indicating whether normal film transport is effected or not, the user may feel uneasy as to possible failure in film transport while taking photographs. For these reasons, it is generally attempted to check the film transport by inspecting the counter dial on the camera or by touching a rewinding knob or a winding lever, but such procedure is by no means reliable and perfect.

The drawbacks as above have been eliminated by the present invention. However, there still remain problems to be solved for fully satisfactory operation since it is desired that the camera have an ability to operate normally even when the film is not loaded therein. For instance, for the explanation of mechanism of the camera to a customer at a camera shop, it may be desired to release the shutter while keeping the camera back open so as to show the customer the release operation. Or during manufacture the shutter release operation has to be checked, or there arises a need to measure the accuracy of exposure operation, the accuracy of lens, etc. Such procedure has to be conducted without loading a film in the camera. If the locking device for the shutter button is provided in such manner that the shutter can not be released without film loading, it would then be impossible to check, measure, or inspect the functions of the camera on the above-mentioned occasions.

The present inventor has directed careful considerations to the foregoing problems and accomplished this invention which provides a camera having novel functions for loading the film and advancing the same during the initial stage of transport.

SUMMARY OF THE INVENTION

An object of this invention is to provide a mechanism which enables the user to readily check from the outside of the camera whether normal film winding operation is effected or not and which is capable of winding only a predetermined amount of the film without making idle exposures when the film is loaded in the camera, the present apparatus thus eliminating failure in winding operation and waste of film due to unnecessary idle exposures or double exposures so as to assure the user of trouble-free film transport during photographing operation.

Another object of the present invention is to provide a mechanism by which shutter release and operation of the film winding lever can be effected as desired when a magazine is not loaded, the mechanism further being so adapted that, until a predetermined amount of the film is wound up on the spool when the magazine is loaded, the release button is retained in locked position and a film transport blocking mechanism is kept released from a film winding shaft thereby making it possible to wind up a predetermined length of the film without shutter release, normal film transport blocking action and shutter release thereafter being effected.

Still another object of the present invention is to provide a mechanism which fulfils the above objects with a few constituent members and which is free of malfunctions.

In accordance with the present invention, a cam for detecting the transport of film from the starting position to the position of the first photographing operation is mounted integrally with a counter dial in a camera in which the film is advanced one frame by one winding action of a winding lever and the counter dial indicates the advance of one frame of the film thus effected. The camera is further provided with another cam to be operated upon detecting the operation of film sensing means which is adapted to be operated upon detecting winding of the film on a spool, means for locking a release lever and means for blocking film transport being operatively associated with a detection lever for detecting the movements of the two cams.

The cam to be rotated together with the dial of the film counter prevents the rotation of the detection lever until a predetermined amount of film has been wound up after initiation of the winding operation, while the cam to be operated upon detecting the operation of the film sensing means prevents rotation of the detection lever until an amount of film has been taken up on the spool. Thus, the detection lever retains the release button locking means and film transport blocking means against movement so as to lock the release button against depression and keep the film transport blocking means disengaged from the film winding means, film winding operation thus being insured without shutter release.

The cam to be rotated together with the counter dial is rotated an angle corresponding to one division of the counter dial every time the film winding operation is made to advance one frame of film and, upon detecting completion of winding up a predetermined amount of film, permits the rotation of the detection lever. The cam to be rotated upon detecting the operation of the film sensing means does not function until the film is wound up on the spool. Accordingly, even when the counter dial operates normally, the detection lever is held against operation unless the film is wound up on the spool. When the leader of the film is taken up on the spool and the stepped base portion of the leader actuates the film sensing means whose sensing portion extends into the spool, thereby indicating that a length of the film has been wound up on the spool, the cam, upon detecting the movement of the sensing means, is rotated to permit the rotation of the detection lever. In the case where such movement of the cam is associated with the rotation of the counter dial, the two cams can be formed as a unitary member so as to dispense with one of the cams. The cam to be rotated integrally with the counter dial plays an auxiliary part to ascertain that a predetermined amount of the film has been wound up. In this way, the release button locking means and film transport blocking means which have been retained against movement by the detection lever are made ready for operation and simultaneously when the release button is freed from locking engagement, film blocking action is effected, the locking means and blocking means thereafter being brought into normal operative relationship with shutter release and film winding operations.

In an instance where the film leader is disengaged from the spool, the film transport blocking means will not be operated during windup operation with the release button held in locked position, while the film sensing means indicates the disengagement of the film.

The present invention is further characterized by provision of magazine detection means for detecting the loading of a film magazine in the camera. The magazine detection means has a detector positioned in the portion of the camera where the magazine is placed and is actuated upon detecting a film magazine when it is loaded in the camera.

One operation member of the magazine detection means is disposed in such arrangement that while the magazine is not loaded the member pushes and thereby rotates the cam for detecting the action of the film sensing means to such position as to permit the operation of the release button locking means and film transport blocking means, the operation member further being so adapted as to relieve the pushing action on the cam upon detecting loading of the magazine, thus allowing the cam to return to the position to block the movement of the detection lever coupled to the release button locking means and the film transport blocking means.

The other operation member of the magazine detection means is coupled to a counter actuating member operated by opening and closing the camera back. As already known in the art, the counter actuating member operates means for preventing reverse rotation of counter so as to return the indication on the counter dial to "0" position when the camera back is opened and to associate the counter with film winding action when the camera back is closed. While the film magazine is not loaded in the camera, the operation member of the magazine detection means actuates the counter actuating member and thereby maintains the camera in the same state as when the camera back is closed. Upon detecting loading of the magazine, this operation member is disengaged from the counter actuating member, which thereafter functions in response to opening and closing of the camera back.

When the film magazine is not loaded in the camera, the magazine detection means pushes and rotates the cam to be operated upon detecting the action of the film sensing means to such position as to permit the operation of the release button locking means and film transport blocking means, the magazine detection means further operating the counter actuating member at the position to actuate the mechanism for preventing reverse rotation of the film counter, so that by operating the winding lever the shutter can be released. While the film is not loaded in the camera, it is possible to effect shutter release to check the operation of the shutter or examine the accuracy thereof. When a film magazine is loaded, the magazine detection means is released from the film winding mechanism and the movements of the release button locking means and film transport blocking means are restricted by the two cams.

Furthermore it is possible to provide a mechanism in which the above-mentioned two cams are simultaneously pushed for rotation by means of one operation member of the magazine detection means. In accordance with such structure, both cams are brought to such position as to permit the operation of the release button locking means and film transport blocking means while the magazine is not loaded. Accordingly, the operation of the winding lever for the initial stage of film winding action (i.e., operation to wind up the film leader) can be eliminated so as to effect shutter release immediately.

The intended objects of the present invention are to be achieved by incorporating a very few number of additional members in a usual film winding mechanism. The mechanism provided by this invention is accurate in operation and free from malfunctions.

Other objects and features of the present invention will become more apparent from a detailed description of the embodiments below.

BRIEF DESCRIPTION OF THE DRAWINGS

The drawings show principal members of an embodiment of the present invention in which other parts already known in the art are omitted.

DESCRIPTION OF THE PREFERRED EMBODIMENTS

Figure 1:
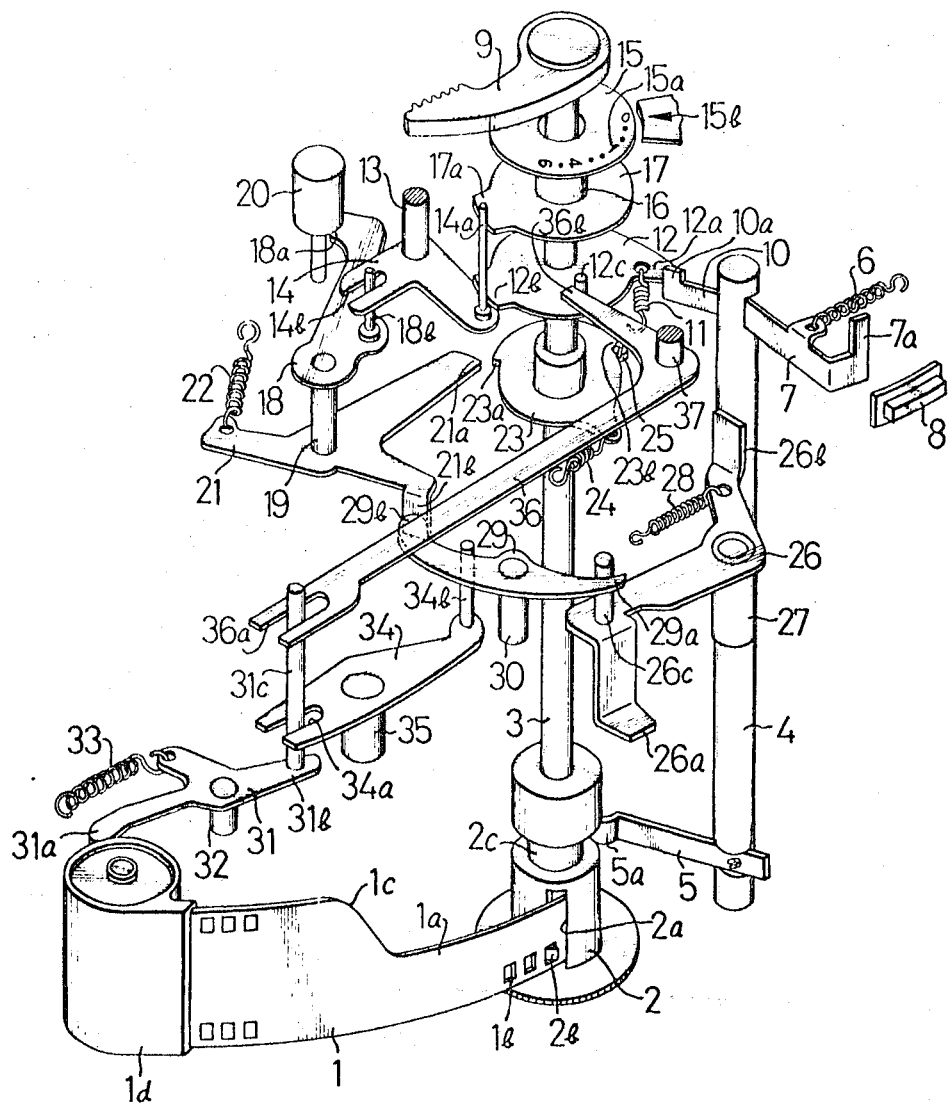
FIG. 1 is a perspective view showing the arrangement of the operation members in an embodiment of the present invention when a film magazine is loaded and the camera back is opened.

Referring to the drawings, designated at 1 is a film and at 2 a spool to be rotated by a winding shaft 3 by means of an operatively associated mechanism known in the art. The end of leader 1a of the film 1 loaded in the camera is first inserted into a slit 2a in the take-up spool 2, a perforation 1b in the film 1 is engaged with a pawl 2b projecting from a slit 2a, and then the camera back (not shown) is closed. An annular groove 2c is formed in the take-up spool 2 at a suitable position where the steplike edge 1c at the base of the leader 1a is brought into proximity with the spool 2. Fixed to the lower end of a winding sensing rod 4 disposed parallel to the winding shaft 3 is a sensing lever 5 whose distal end is bent in semicircular form to provide a sensing portion 5a which is adapted for resilient contact with the bottom of the annular groove 2c by a spring 6. The winding sensing rod 4 is provided with an indication lever 7 secured to its upper end, the indicator 7a thereof being adapted to be inspected through a window 8 formed in the camera body.

When the winding lever 9 fixed to the upper end of the winding shaft 3 is rotated in a counter-clockwise direction as seen in the drawing, the spool 2 is rotated in one direction together with the winding shaft 3 to wind up the film 1. When the leader 1a of the film 1 is wound up and the edge 1c is further wound up, the sensing portion 5a of the sensing lever 5 which is positioned in the annular groove 2c in the spool 2 is pushed out by the edge 1c against the action of the spring 6, whereby the winding sensing rod 4 is turned clockwise and the indicator 7a of the indication lever 7 is moved leftward in the figure. As the film is wound up on the spool 2 with resultant increase in diameter, the rotational displacement of the winding sensing rod 4 increases followed by the movement of the indication lever 7, so that the displacement of the indicator 7a also increases, thereby indicating that the film is progressively wound up on the spool. It will now be apparent that unless the film is actually wound up on the spool, there will be no displacement of the indicator, the indication system thus makes it possible for the operator to ascertain the winding action from the outside of the camera.

The winding sensing rod 4 is further provided with an actuating arm 10 whose actuating end 10a is held in resilient contact with an arm 12a of a first cam 12 for allowing film transport without shutter release which cam is urged in a clockwise direction in the drawing, the first cam 12 thus being adapted for counterclockwise rotation in operative relationship with the clockwise movement of the sensing rod 4.

The first cam 12 has a projection 12b extending from its periphery and held in sliding contact with a detection pin 14a implanted at one end of a detection lever 14 which is adapted to be moved about a pivot 13. When the sensing portion 5a of the lever 5 is pushed out of the annular groove 2c during film winding operation, the projection 12b of the first cam 12 is pivotally retracted from the path of the detection pin 14a to be moved pivotally when the detection lever 14 is rotated, the detection lever 14 thus being allowed to move in a counterclockwise direction. However, insofar as the film has not been wound up a predetermined amount, the detection pin 14a is kept in sliding contact with a projection 17a formed on the periphery of a second cam 17 for allowing film transport without shutter release fixedly mounted on a cylindrical shaft 16 of a counter dial which is disposed coaxially with the winding shaft 3, the arrangement being such that while the film has not yet been wound up a predetermined amount when the film 1 is loaded in the camera, the counterclockwise rotation of the lever 14 is prevented.

As already known, the counter dial 15 is in operative relationship with the film winding operation effected by the winding lever 9. When the winding lever 9 winds up the film one frame, the counter dial 15 is rotated an amount corresponding to one division of counter scale 15a and a mark 15b indicates the number of wound up frames. Accordingly, a predetermined amount of the film can be wound up without releasing the shutter, and it is when "1" on the counter scale 15a comes to the position of the mark 15a that the projection 17a of the second cam 17 is retracted from the path of pivotal movement of the detection pin 14a to permit the counterclockwise movement of the detection lever 14.

Indicated at 18 is a locking lever adapted to be moved about a pivot 19 and having a hook 18a at its distal end positioned under the stepped portion of a release button 20. As already known in the art, the locking lever 18 is operatively related with film winding operation to permit the depression of the release button 20 and while the film has not been wound up, the lever prevents shutter release by locking the release button.

A film transport blocking lever 21 is adapted to be moved integrally with the locking lever 18 by means of the pivot 19 and biased in a clockwise direction in the figure by a spring 22. As the locking lever 18 is pivotally moved in the direction to permit depression of the release button 20, the blocking lever 21 is also moved in the same direction to cause an arresting end 21a to engage a stepped portion 23a of a plate 23 secured to the winding shaft 3 for prevention of winding action effected by the winding lever 9. Acting on the plate 23 is a restoring spring 24 which serves to return the winding lever 9 in a clockwise direction automatically. A stopper 25 adapted for engagement with a stepped portion 23b defines the position to which the winding lever is to be returned.

Figure 2:
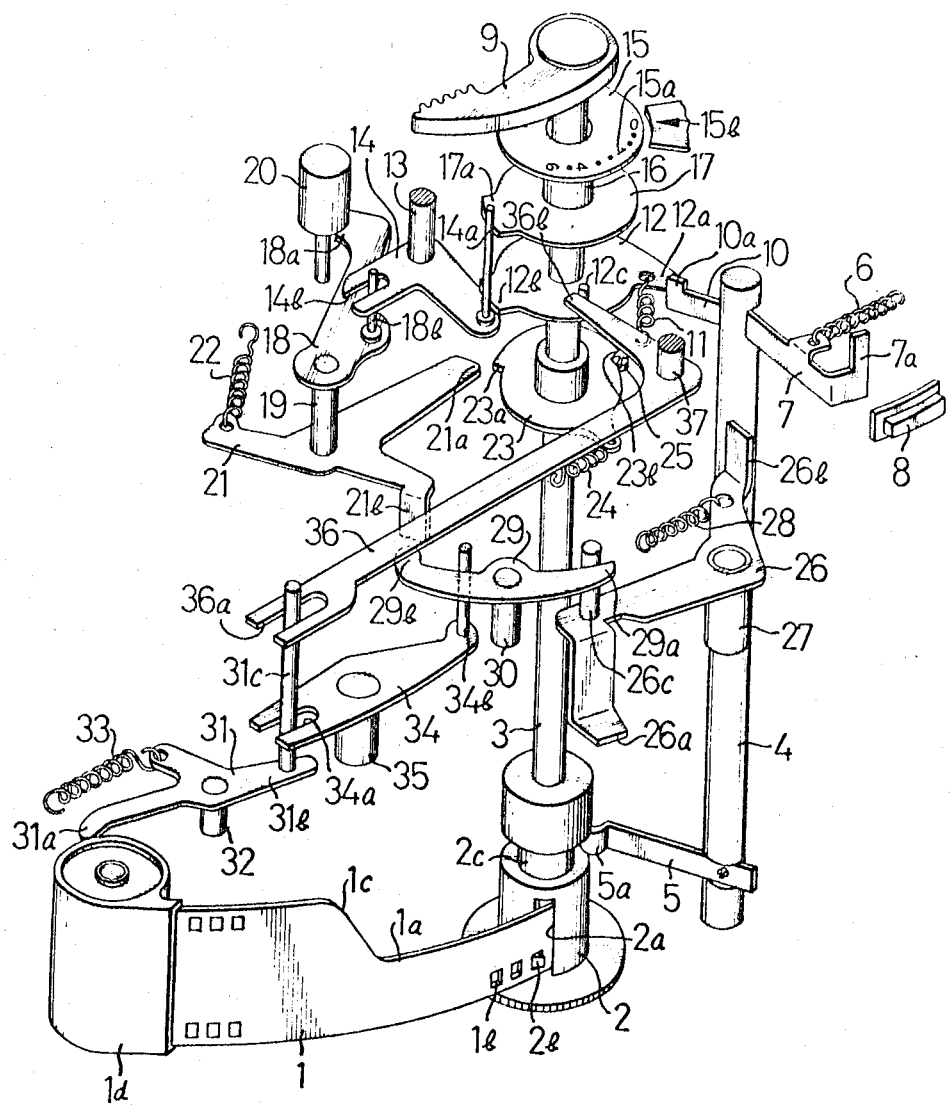
FIG. 2 is a perspective view in sequential relation with FIG. 1 showing the arrangement of the operation members when the camera back is closed in the state shown in FIG. 1.

To describe in greater detail, the locking lever 18 and the film transport blocking lever 21 which are always urged clockwise by the spring 22 are adapted for pivotal movement in operative relationship with film winding operation and shutter release by way of an unillustrated mechanism as already known, and upon completion of winding up a frame of film, the arresting end 21a of the blocking lever 21 comes into engagement with the stepped portion 23a of the plate 23 to prevent the winding lever 9 from moving counterclockwise, while, at the same time, the hook 18a of the locking lever 18 is retracted from under the stepped portion of the release button 20 so as to permit depression of the release button 20. When the release button 20 is depressed for shutter release, the levers 18 and 21 are immediately pushed in a counterclockwise direction by an unillustrated mechanism. Thus, the hook 18a of the locking lever 18 engages the under face of the stepped portion of the release button 20 and locks the button 20 when it is returned upward, while the arresting end 21a of the blocking lever 21 is retracted from the stepped portion 23a to make the camera ready for film winding operation. In this structure the locking lever 18 is provided with a pin 18b in engagement with a groove 14b formed in the detection lever 14 associated with the first cam 12 and the second cam 17 so as to limit the movement of the release button locking lever 18 and the film transport blocking lever 21 by the cams 12 and 17. More specifically, the cam projections 12b, 17a of the respective cams 12, 17 as shown in FIG. 2 are positioned in the path of the detection pin 14a on the detection lever 14 to prevent the counterclockwise movement of the detection lever 14, which in turn blocks the pivotal movement of the levers 18 and 21. Consequently, the locking lever keeps the release button 20 locked and the blocking lever permits the winding action of the winding shaft 3. Thus, the film can be wound up in the state shown in FIG. 2. The leader 1a of the film 1 will be wound up on the spool 2 during winding operation to push the sensing portion 5a of the sensing lever 5 out of the annular groove 2c in the spool 2, with the result that the projection 12b of the first cam 12 will be retracted from the path of the detection pin 14a, but until a predetermined amount of the film 1 is wound up, the projection 17a of the second cam 17 retains the detection lever 14 against counterclockwise pivotal movement. When the indication "1" on the counter dial 15a is brought to the position of the mark 15b after the predetermined amount of the film 1 has been wound up, the projection 17a will be retracted from the path of the detection pin 14a thereby making it possible for the detection lever 14 to move in a counterclockwise direction. Since the locking lever 18 and the film transport blocking lever 21 are operatively associated with film winding and shutter release as previously described, the detection lever 14, when set free for counterclockwise movement upon the predetermined amount of film being wound up on the spool 2, permits the levers 18 and 21 to move in a clockwise direction. The arresting end 21a of the film transport blocking lever 21 engages the stepped portion 23a in the plate 23 to lock the film and the locking lever 18 frees the release button 20. The parts are brought to the positions illustrated in FIG. 3.

When the release button 20 is depressed to release the shutter, the film transport blocking lever 21 tends to be moved counterclockwise in operative relation with the shutter release so as to free the winding lever 9, but while the release button 20 is in depressed position, the hook 18a at the distal end of the locking lever 18 is held in abutting contact with the side face of the release button 20 and film transport will still be blocked. It is when the release button 20 is returned to position that the release button 20 is locked and film transport blocking is relieved. The winding lever 9 will then be able to move counterclockwise again for winding operation. Thus, winding up a frame of the film 1 releases the release button and blocks film winding action. During the foregoing operations the detection lever 14 is also reciprocated pivotally without being interfered with by the first and second cams 12, 17 since the projections 12b and 17a are already retracted from the path of pivotal movement of the detection pin 14a.

After a predetermined number of frames of film have been exposed by repeating the foregoing operations, the film is rewound into the film magazine 1d, the camera back is opened and the film magazine is taken out.

A lever 26 for returning the film counter to "0" position, serving as a film counter actuating member, is adapted for reciprocal pivotal movement about a pivot 27 in operative relationship with the opening and closing of the camera back as already known, the lever 26 being so adapted that when the camera back is closed and a lug 26a is thereby pushed, the lever 26 is rotated in a clockwise direction to cause the upstanding portion 26b at the other end thereof to actuate a mechanism for preventing reverse rotation of the film counter, with the result that every time the film is advanced one frame the counter dial is rotated counterclockwise an amount corresponding to one division of the counter scale, the lever further being so adapted, when the camera back is opened, to be rotated in a counterclockwise direction under the action of a spring 28 to release the abovementioned mechanism and return the film counter to the starting position.

An idle lever 29 is adapted for pivotal movement about a pivot 30. When the camera back is opened, a pin 26c on the return lever 26 pushes an end 29a to move the idle lever 29 in a clockwise direction and causes a pushing portion 29b at the other end thereof to push a downwardly extending lug 21b of the film transport blocking lever 21, so that the levers 21 and 18 are rotated in a counterclock direction. The winding lever 9 is therefore freed from locking and at the same time the release button 20 is held in locked position. Further due to the resultant clockwise rotation of the detection lever 14, the detection pin 14a is moved outwardly of the projections 12b and 17a.

After the film has been rewound, the sensing portion 5a at the extreme end of the sensing lever 5 is brought into the annular groove 2c of the spool 2 under the action of the spring 6 and accordingly the arm 10 is retracted from the arm 12a of the first cam 12. The above-mentioned movement of the detection pin 14a allows the second cam 12 to return to the position shown in FIG. 1 under the influence of the spring 11. Since the second cam 17 is so biased that upon release of the mechanism for preventing reverse rotation of counter the cam 17 is returned to the starting position together with the counter dial 15, the movement of the detection pin 14a above also returns the second cam 17 to the starting position shown in FIG. 1.

In order to make it possible to effect shutter release when the film magazine 1d is not loaded in the camera, a magazine detection lever 31 is provided. The magazine detection lever 31 is adapted for rotation about a pivot 32 and biased in a counterclockwise direction by a spring 33. The detecting portion 31a at its distal end, extending into the part of the camera for receiving the film magazine, detects the film magazine 1d when it is loaded in the camera and is pushed by the magazine 1d, with the result that the magazine detection lever 31 is turned clockwise against the action of a spring 33.

Extending from the rear end 31b of the magazine detection lever 31 is an actuating pin 31c which is engaged with a crotch 34a in a link lever 34 and a crotch 36a in a cam actuating lever 36. The link lever 34 is adapted to be moved about a pivot 35 in operative relation with the magazine detection lever 31, while the cam actuating lever 36 is adapted for rotation about a pivot 37 also in operative relation with the magazine detection lever 31. Accordingly, when the magazine detection lever 31 is turned clockwise by loading the film magazine 1d, the link lever 34 and the cam actuating lever 36 are rotated in a counterclockwise direction.

Figure 4:
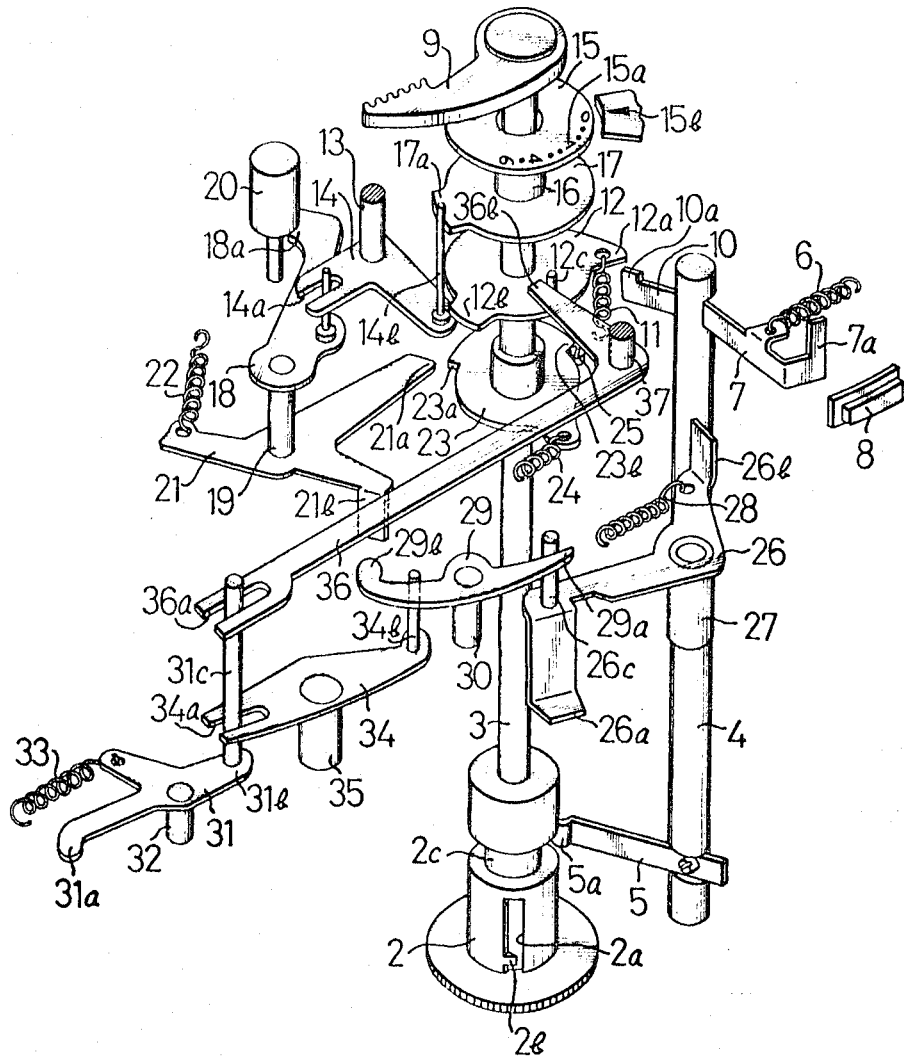
FIG. 4 is a perspective view similar to FIG. 1 showing the arrangement of the operation members when a film magazine is not loaded in the camera.

The link lever 34 is provided at its rear end with a pin 34b which, as shown in FIG. 4, prevents the idle lever 29 from being moved in a clockwise direction by the return lever 26 while the magazine is not loaded in the camera, the pin 34b further being adapted to allow the idle lever 29 to move in a clockwise direction when the above-mentioned counterclockwise rotation of the link lever 34 is effected, whereupon the pushing portion 29b of the lever 29 is brought into pushing contact with the lug 21b of the blocking lever 21 as shown in FIG. 1. At the same time, the return lever 26 releases the mechanism for preventing reverse rotation of the film counter.

It will be seen in FIG. 4 that when the film magazine 1d is not loaded in the camera, the cam actuating lever 36 pushes by the rear end 3b the pin 12c mounted on the first 12 under the influence of the spring 33 to rotate the first cam 12 in a counterclockwise direction against the action of the spring 11 and thereby remove the projection 12b from the path of the detection pin 14a. When the magazine 1d is loaded, the actuating lever 36 is turned counterclockwise in operative relation with the magazine detection lever 31 to relieve the first cam 12 from pushing action, whereupon the first cam 12 is rotated in a clockwise direction by the spring 11, the projection 12b thereby being brought to the path of the detection pin 14a so as to block the counterclockwise rotation of the detection lever 14 as seen in FIG. 1.

When the camera back is closed, the clockwise rotation of the return lever 26 thereby effected as already described brings the advancing mechanism of the film counter into meshing engagement while relieving the clockwise pressure acting on the idle lever 29 to free the lug 21b of the blocking lever 21 from pushing action exerted by the pushing portion 29b. However, since the detection pin 14a is in contact with the projections 12b, 17a of the first cam 12 and second cam 17, the blocking lever 21 does not block film transport, with the release button 20 retained against depression by the locking lever 18 (see FIG. 2).

Figure 3:
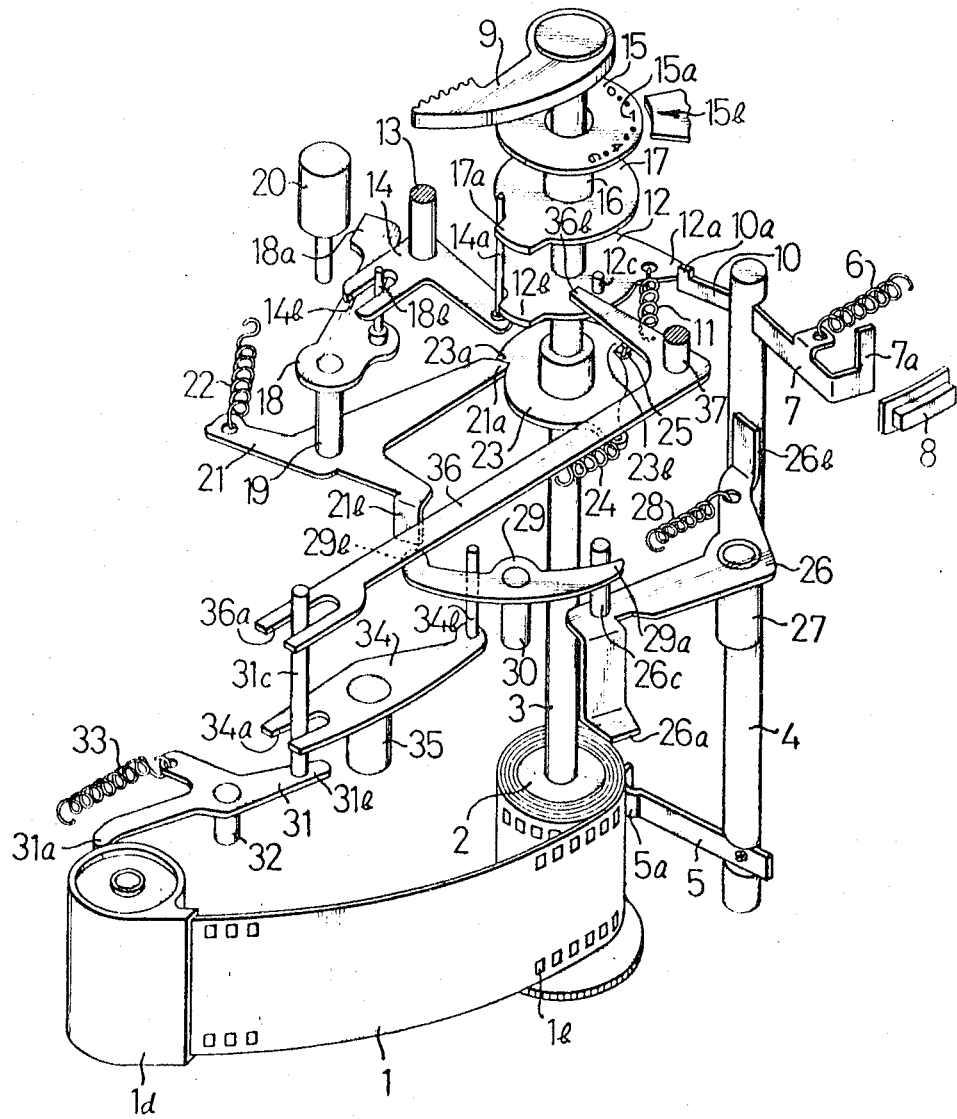
FIG. 3 is a perspective view in sequential relation with FIG. 2 showing the arrangement of the operation members as the film has been wound up to the photographing position in the state shown in FIG. 2.

In this position the winding lever 9, when turned, winds the film 1 on the spool 2 and advances the film counter. At the time when the first frame to be exposed is brought to the photographing position, the two cams 12, 17 are brought to the positions to permit rotation of the detection pin 14, and accordingly the locking lever 18 and blocking lever 21, freed from locking action by the detection lever 14, are now ready to rotate. Thus film transport blocking is effected, while the release button 20 is unlocked as shown in FIG. 3.

Description will now be given with respect to the state in which the film magazine is not loaded (as well as to the case where the film magazine has been taken out from the camera).

When the film magazine is not loaded in the magazine loading section of the camera, the detecting portion 31a at the end of the magazine detection lever 31 extends into the loading section. As apparent from the comparison of FIG. 1 with FIG. 4, the detection lever has been rotated in a counterclockwise direction from the position shown in FIG. 1 by means of the spring 33. The link lever 34 and the cam actuating lever 36 associated with the detection lever 31 by the actuating pin 31c have been pivotally moved in a clockwise direction from the positions in FIG. 1. During this movement, the link lever 34 rotates the idle lever 29 in a counterclockwise direction by the pin 34b to release the pushing portion 29b thereof from the lug 21b of the blocking lever 21 and thereby set the blocking lever 21 and the locking lever 18 free to function. On the other hand, the end 29a of the idle lever 29 pushes the pin 26c on the return lever 26, bringing the return lever 26 to the same position as when the camera back is in closed position. As a result, the mechanism for advancing the film counter is brought into meshing engagement and the film counter is ready to advance upon operation of the winding lever 9. The cam actuating lever 36, with its end 36b, rotates the first cam 12 in a counterclockwise direction causing the projection 12b to retract from the path of the detection pin 14a. In this manner, the state shown in FIG. 4 is brought about.

Figure 5:
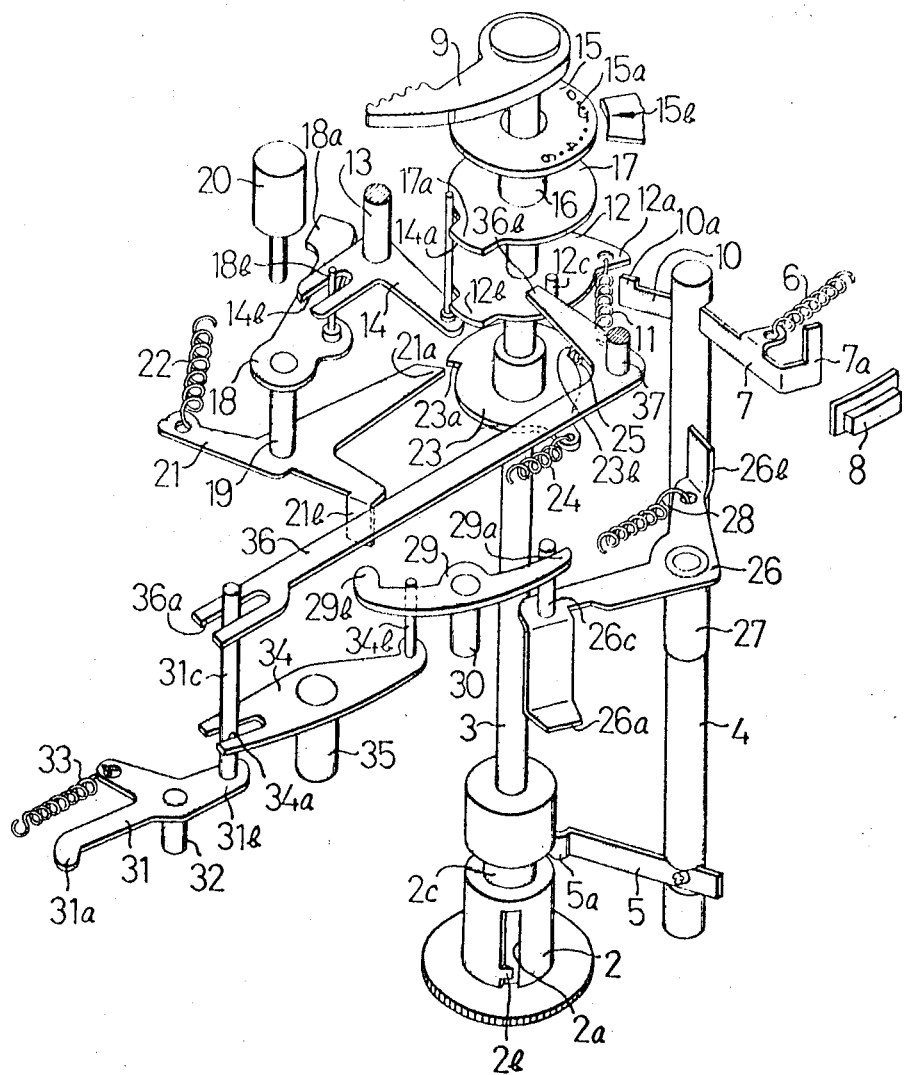
FIG. 5 is a perspective view in sequential relation with FIG. 4 showing the arrangement of the operation members when the winding lever is operated in the state shown in FIG. 4 so as to permit the release button to be depressed.

Next, when the winding lever 9 is turned, the film counter is advanced. By operating the winding lever 9 to the same extent as when a predetermined amount of the film is wound up, the projection 17a on the second cam is retracted from the path of the detection pin 14a, with the result that the spring 22 disengages the locking lever 18 from the release lever 20 and brings the blocking lever 21 into locking relation with the winding lever 9. The parts are now in the positions illustrated in FIG. 5.

Since shutter release can now be effected by depressing the release button 20, it is possible to ascertain the opening and closing actions of the shutter or to release the shutter when such operation is desired during manufacture or explanation for sale.

When the film magazine 1d is placed into the magazine loading section, the respective members are instantaneously brought to the positions shown in FIG. 1, whereupon the safety mechanism for effecting film advance without shutter release is made ready for operation as already described to eliminate waste of film.

Figure 6:
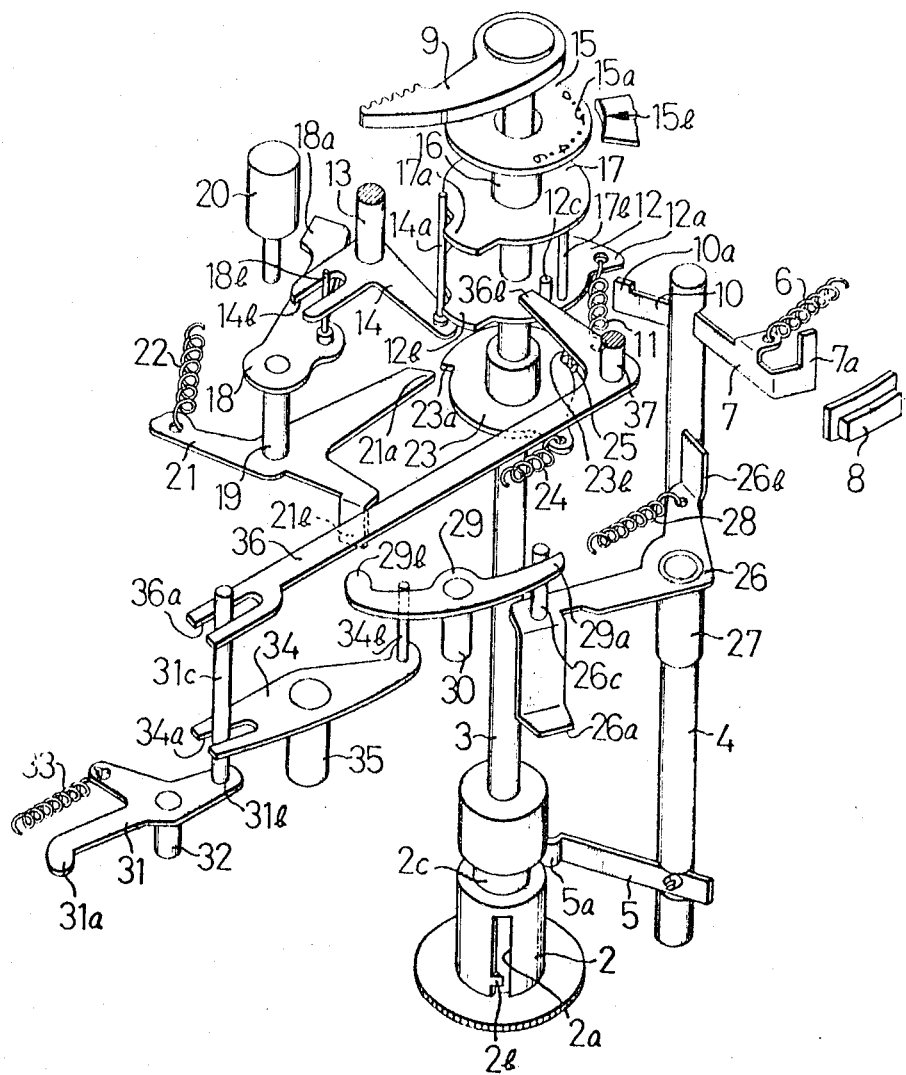
FIG. 6 is a perspective view of another embodiment in which the arrangement of the operation members is shown when the film magazine is not loaded.

FIG. 6 shows an embodiment in which the foregoing mechanism is so modified that when the cam actuating lever 36 is rotated in a clockwise direction (i.e. when the film magazine is taken out of the camera and when the magazine is not loaded in the camera) the second cam 17 is rotated in a counterclockwise direction simultaneously with the counterclockwise rotation of the first cam 12. The second cam 17 is provided with a downwardly extending pin 17b which is associated with the end 36b of the cam actuating lever 36. Thus, the first cam 12 and the second cam 17 can be moved simultaneously in a counterclockwise direction in operative relationship with the clockwise rotation of the cam actuating lever 36 so as to simultaneously retract the projections 12b, 17a of the cams 12, 17 from the path of the detection pin 14a. When the film magazine is not loaded in the camera, therefore, the counter dial is immediately brought from the starting position to the position where shutter can be released while finishing windup operation as required. It will be apparent that the embodiment of FIG. 6 eliminates the procedure to bring the parts as positioned in FIG. 4 to the positions illustrated in FIG. 5.

In accordance with the foregoing description of the embodiment, the projection 12b of the first cam 12 is retracted from the path of the detection pin 14a of the detection lever 14 when the sensing portion 5a of the sensing lever 5 is pushed out of the annular groove 2c in the spool 2 by the steplike edge of the film leader 1a. However, an alternative structure may be provided in which the projection 12b is adapted to be retracted from the path of the detection pin 14a upon detecting the movement of the detection lever 5 when a predetermined amount of the film 1 is wound up on the spool 2. With such structure, the first cam 12 and the second cam 17 may be formed as one member which may be provided integrally with the counter dial, a unitary cam thus formed being further provided with a cam projection to be associated with the detection pin 14a and a portion to be driven by the actuating arm 10. In this arrangement the cam may be returned to the starting position by a restoring spring disposed in the film counter mechanism and the spring 11 shown may be omitted.

I claim:
1. A roll film camera comprising:
   a shutter release member;
   a film winding spool having an annular groove between the ends thereof;
   film sensing means including a sensing member movable between advanced and retracted positions in and out of engagement with said groove;
   first means for releasably locking said shutter release member in a retracted position and movable between lock and release positions;
   second means responsive to said film sensing means for urging said first means to its release position with the retraction of said sensing member; and
   third means movable with said shutter release member locking means for permitting and inhibiting the rotation of said spool with the respective lock and release positions of said shutter release member locking means.
2. The camera of claim 1 comprising a film frame counter, and means responsive to the position of said film frame counter for releasably maintaining said shutter release member locking means in its lock position independent of said film sensing means.
3. The camera of claim 1 including means for sensing the presence and absence of a film magazine in said camera and means responsive to said magazine sensing means in the absence of a magazine in the camera for shifting said shutter release member locking means to its release position independent of said film sensing means.
4. The camera of claim 3 including a film frame counter means responsive to the opening and closing of the camera back for preventing reverse rotation of said film counter, and means responsive to said magazine sensing means for urging said reverse rotation preventing means to a camera back closed position.
5. The mechanism of claim 1 wherein said second means comprises a first cam rotatable with the movement of said sensing means, a frame counter a second cam rotatable with said counter and a detection lever whose operation is restricted by said two cams, said detection lever being adapted to permit the operation of said third means and said release member locking means only when said two cams detect that a predetermined amount of the film has been wound up on said spool and to prevent the operation of said release member locking means and said third means and thereby keep said release member locked and said third means in a spool release position when a predetermined amount of film has not been wound up on said spool.
6. A roll film camera comprising in combination,
   a shutter release member;
   a film winding spool having an annular groove between the ends thereof;
   a winding detecting member movable into and out of engagement with said groove;
   an actuating arm movable with said detecting member;
   a shutter release lock member;
   means operatively coupling said lock member with the said actuating arm including a first cam and an engaging intermediate lever for releasably locking said shutter release member in response to the operation of the said actuating arm;
   a blocking member rotatable with the said shutter release lock member and operative to lock an abutment rotatable with said film winding spool with the release of the said shutter release member by said shutter release lock member and to unlock the said abutment with the locking of said shutter release member.

* * * * *